United States Patent
Henry

(10) Patent No.: US 8,042,620 B2
(45) Date of Patent: Oct. 25, 2011

(54) MANUALLY ADJUSTABLE PACKER WHEEL SEEDING SYSTEM AND METHOD

(75) Inventor: Jim Henry, Sakatoon (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 12/472,810

(22) Filed: May 27, 2009

(65) Prior Publication Data
US 2010/0300339 A1 Dec. 2, 2010

(51) Int. Cl.
*A01B 49/04* (2006.01)
*A01B 61/00* (2006.01)
*A01C 5/00* (2006.01)
*A01C 13/00* (2006.01)

(52) U.S. Cl. ......... 172/262; 172/264; 111/136; 111/194

(58) Field of Classification Search .......... 172/261–271, 172/2, 4, 5–12; 111/52–72, 134–137, 194, 111/195
See application file for complete search history.

(56) References Cited

U.S. PATENT DOCUMENTS

| 1,006,771 | A | 10/1911 | Metzler |
| 2,782,740 | A | 2/1957 | Wood |
| 3,170,421 | A | 2/1965 | Norris et al. |
| 4,236,583 | A | 12/1980 | Geurts |
| 5,954,139 | A | 9/1999 | Forsyth |
| 6,142,085 | A * | 11/2000 | Drever et al. ................. 111/151 |
| 7,261,048 | B1 * | 8/2007 | Hantke ........................ 111/56 |
| 2006/0162632 | A1 * | 7/2006 | Bourgault et al. ........... 111/200 |
| 2008/0257238 | A1 * | 10/2008 | Friesen ........................ 111/163 |

FOREIGN PATENT DOCUMENTS
DE 103 09 664 A1 9/2004
EP 1 529 431 A1 11/2004
* cited by examiner

*Primary Examiner* — Christopher J. Novosad
(74) *Attorney, Agent, or Firm* — Rebecca Henkel

(57) ABSTRACT

An implement includes a frame configured to couple to a tool bar, a linkage coupled to the frame, and a ground engaging tool extending from a shank, wherein the shank is coupled to the linkage. The implement also includes a packer wheel configured to control a position of the ground engaging tool, wherein the packer wheel is positioned behind the ground engaging tool when the ground engaging tool is engaging the soil. Further, the implement includes an adjustment mechanism configured to allow for adjustment of the distance between the packer wheel and the ground engaging tool.

9 Claims, 6 Drawing Sheets

US 8,042,620 B2

MANUALLY ADJUSTABLE PACKER WHEEL SEEDING SYSTEM AND METHOD

BACKGROUND

The present invention relates generally to the field of agricultural implements, such as tillers and implements towed behind a work vehicle, such as a tractor.

A wide range of agricultural implements have been developed and are presently in use for tilling, cultivating, harvesting, seeding, and so forth. Seeding implements, for example, are towed behind tractors and open rows of soil for deposition of a seed or product in the soil. The implement may include a plurality of ground engaging tools. In certain implements, packing wheels may follow the ground engaging tools to close valleys and/or pack soil after seeds or fertilizer has been deposited into the valleys opened by the tools. In general, these wheels are spaced from the tools by a fixed distance, determined at the time of design and/or manufacturing of the implement. However, the appropriate spacing between the ground engaging tools and the packer wheels may be less than optimal for all situations. For example, when the implement is being pulled more quickly through a field, a wheel that was properly spaced when moving more slowly may be too close. On the contrary, if the wheel is spaced farther from the tool as might be appropriate for higher speeds, this distance may not be optimal for slower speeds.

Moreover, the ground engaging tools may encounter obstacles in the field, such as large clods or rocks. The obstacles may deform, damage, and/or break the tools if the implement is traveling at a high speed and/or the obstacle is large. Some implements may be configured to lift the tools upon encountering an obstacle. Unfortunately, such configurations of the implement may sacrifice accuracy and control over the depth of soil valleys in order to avoid tool damage due to obstacles.

BRIEF DESCRIPTION

In one embodiment, a seeding implement includes a frame configured to couple to a tool bar, a linkage coupled to the frame, and a ground engaging tool extending from a shank, wherein the shank is coupled to the linkage. The ground engaging tool is configured to be displaced automatically upon encountering an obstruction. The implement also includes a packer wheel configured to control a position of the ground engaging tool, wherein the packer wheel is positioned directly behind the ground engaging tool when the ground engaging tool is engaging a soil region. Further, the implement includes an adjustment mechanism configured to allow for manual adjustment of a distance between the packer wheel and the ground engaging tool. The forward-most position of the packer wheel may be so located as to ensure that the ground engaging tool will clear the packer wheel when displaced upon encountering an obstruction.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
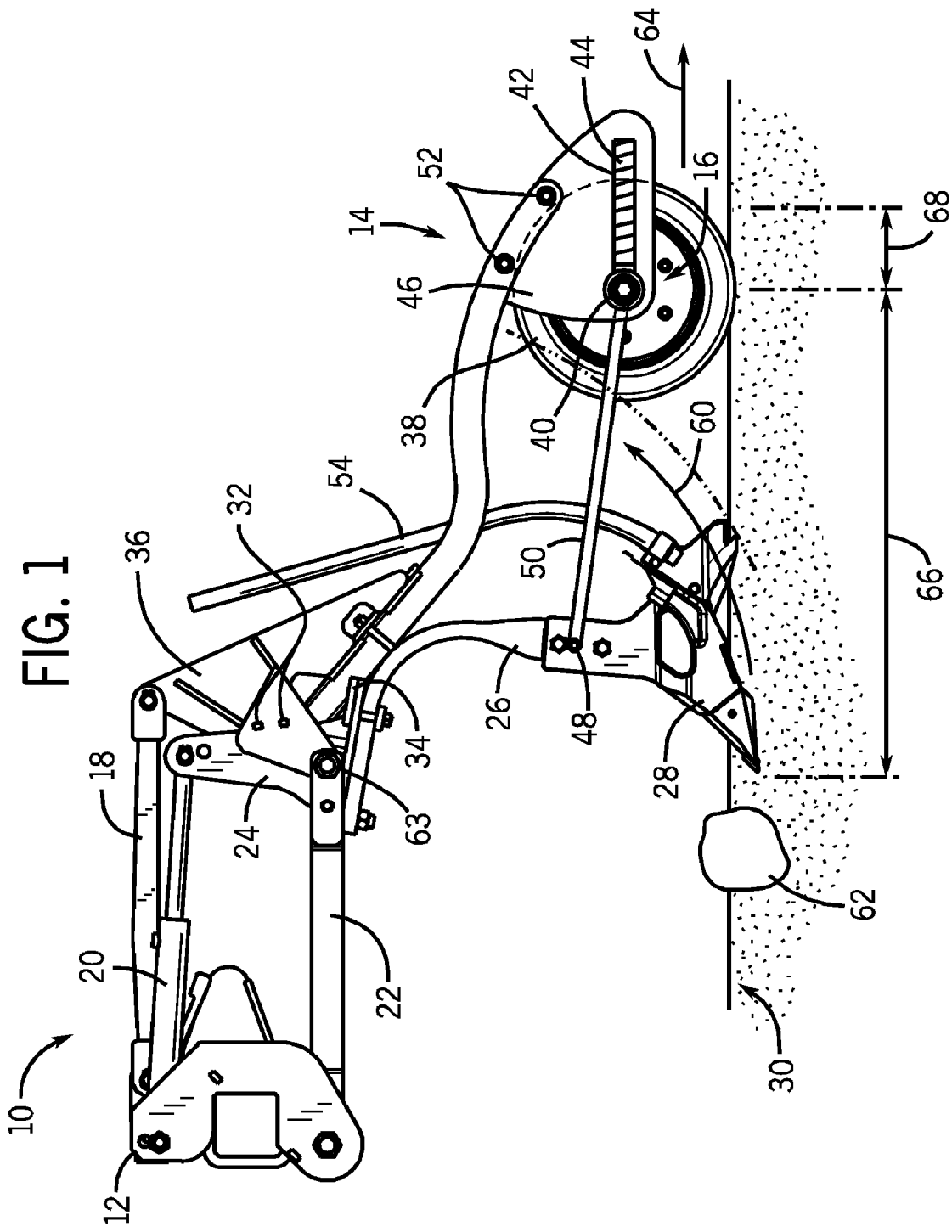
FIG. 1 is a side view of a precision hoe opener assembly including an opener, a packer wheel, and a soil shaping assembly.

Turning now to the drawings and referring first to FIG. 1, an embodiment of a precision hoe opener assembly is illustrated and designated generally by reference numeral 10. As may be appreciated, the precision hoe opener assembly 10 is a type of row unit, which may be placed on an agricultural implement, such as a planter or seeder. The precision hoe opener assembly 10 includes a frame support 12, a packer wheel assembly 14, an adjustment mechanism 16, a first member 18, a linear actuator, in the form of cylinder 20, and a second member 22. The cylinder 20 may be a hydraulic or pneumatic cylinder assembly and may be coupled to a power supply that is used to provide a flow of pressurized hydraulic fluid to displace as a rod extending from the cylinder. The precision hoe opener assembly 10 may be part of an implement assembly that is towed by a vehicle, such as a tractor. For example, the frame support 12 may couple to a tool frame tool bar connected to the tractor, via a hitch assembly, for towing the precision hoe opener assembly 10. For instance, a plurality of precision hoe opener assembly 10 may be mounted in parallel along a tool frame bar to comprise a seeder implement or unit.

As discussed in detail below, the precision hoe opener assembly 10 enables the depth and position of the opener to be controlled by the packer wheel assembly 14, thereby enabling each of the openers of a seeder unit to be independently controlled, enhancing seeding performance and accuracy. Precise depth control may lead to improved crop fertilization and yield. Alternatively, in other systems, the depth of an implement hoe openers may be controlled by a single mechanism coupled to a tool bar, such as a plurality of support wheels. For example, the depth of a soil valley or groove created by each of the hoe openers may increase as the supporting wheels lower the tool bar and frame toward the soil. In such a case, seeding accuracy may be reduced due to the large swaths of land and changes in elevation encountered by the implement. In the depicted embodiment, the precision hoe opener assembly 10 includes a packer wheel assembly 14 coupled to the precision hoe opener assembly 10. The packer wheel assembly 14 includes the adjustment mechanism 16 configured to shift a packer wheel upon a ground engaging hoe opener encountering an obstacle. Accordingly, the packer wheel may be positioned directly behind the hoe opener to enable greater depth accuracy and control over the seeding process while providing sufficient clearance to enable the hoe opener to avoid damage from obstacles. As may be appreciated, components of the precision hoe opener assembly 10, such as the frame support 12, the packer wheel assembly 14, the first member 18, and the second member 22, may be made of any suitable durable material, such as a stainless steel or a metal alloy.

As depicted, the cylinder 20 is attached to a shank adapter 24 via a pin at the end of a piston rod of the cylinder 20. The shank adapter 24 is also coupled to a shank 26 and a ground engaging hoe opener 28. The shank adapter 24 may be coupled to the shank 26 via fasteners, such as bolts or rivets, which enable position adjustments of the hoe opener 28. Further, adjustments of the hoe opener 28 via the fasteners, along with the packer wheel 14, enable a variable seeding depth for the precision hoe opener assembly 10. As depicted, the hoe opener 28 is in a forward, neutral, or normal working position, wherein the opener is engaging a soil 30 region to create a valley or groove for seeding. As the elevation of the soil 30 fluctuates, the position of the hoe opener 28 may move upward or downward from the illustrated neutral or normal position. The cylinder is extended in the normal position, thereby deploying the hoe opener 28 downward into the soil 30, pressing the shank adapter 24 against rear frame stops 32. In addition the surface of the soil 30 may be shaped and moved by the hoe opener 28. By positioning the packer wheel assembly 14 close to the hoe opener 28, via the adjustment assembly 16, the depth of the valley created in the soil 30 may be precisely controlled.

The hoe opener 28 moves upward or downward based upon the retraction or extension of the cylinder 20. As the cylinder 20 retracts, a stop plate 34 may press upon a portion of a rear frame 36, creating a lifting force that is conveyed to the packer wheel assembly 14. As depicted, the packer wheel assembly includes an arm or member that is coupled to the rear frame 36. The resulting lifting force, caused by the cylinder 20, reduces the packing force of the packer wheel 14. In the embodiment illustrated, a packer wheel arm 37 or member may enable a height adjustment of the packer wheel assembly 14 via the coupling, which may be an adjustable U-bolt or other fastener. The position of a packer wheel 38 and the packer wheel assembly 14 controls the depth of the valley opened in the soil 30 by the hoe opener 28. The packer wheel 38 may be supported by, and coupled to, the packer wheel assembly 14 via an axle 40. For example, the axle 40 may be positioned in a slot 42 and through a center of the packer wheel 38, thereby rotationally supporting the packer wheel 38 and a portion of the precision hoe opener assembly 10. In addition, the axle 40 is also coupled to a biasing member 44, such as a spring. The biasing member 44 may be configured to urge the packer wheel 38 forwardly within the slot 42, which is located in a mounting bracket 46. Additionally, the biasing member 44 may be secured to both the axle 40 and a portion of the mounting bracket 46. The axle 40 may be coupled to the shank 26 via a pivot pin 48 and a linkage member 50. For example, the linkage member 50 may be comprised of a suitable durable material, such as stainless steel, and may be pivotally mounted at each end to the pivot pin 48 and the axle 40. As will be discussed in detail below, a movement of the linkage member 50 may overcome the forces of the biasing member 44 to move the packer wheel 38 rearwardly. The bracket 46 may be coupled to the packer wheel arm 37 via bolts 52, or other suitable coupling mechanism. After a valley in the soil 30 is created by the hoe opener 28, a seeding assembly 54 may deposit a seed in the valley for growth of a crop as desired by the operator. The packer wheel assembly 12, adjustment mechanism 16, and packer wheel 38 may be configured to include additional packer wheels and/or openers, where the adjustment mechanism 16 enables improved seed depth accuracy while providing clearance for tripping of at least one opener.

The hoe opener 28 and shank 26 may trip and retract in a direction 60 rearwardly and vertically, to avoid damage to the hoe opener 28 upon encountering obstacle or obstruction 62, such as a rock or large clod of dirt. The hoe opener 28 and shank 26 may trip and pivot upon a bolt coupling 63, which couples the shank adapter 24 to the frame 36. As the hoe opener 28 trips in a direction 60, the coupling of the linkage member 50 between the shank 26 and axle 40, moves the packer wheel 38 rearwardly in a direction 64. Specifically, the pivot pin 48 moves rearwardly as the hoe opener 28 moves rearwardly, causing the linkage member 50 to push the axle 40 rearwardly, as indicated by reference numeral 64, in turn shifting the packer wheel 38 within the slot 42 to avoid contact with the hoe opener 28 and provide clearance. Further, the rearward motion 60 of the shank 26 and hoe opener 28 provides sufficient force to overcome the biasing member 44, thereby compressing the biasing member 44 as the packer wheel moves rearwardly. The adjustment mechanism 16, including the axle 40, slot 42, biasing member 44, pivot pin 48, linkage member 50, provides a system to enable the packer wheel 38 to be placed directly behind the hoe opener 28.

By placing the packer wheel 38 directly behind the opener 28, seeding depth accuracy is improved while providing a mechanism for tripping clearance, enabling the hoe opener 28 to move rearwardly without interference of the packer wheel 38. For example, in a normal and forward position, the packer wheel 38 may be located a distance 66 from the hoe opener 28. Upon encountering the obstruction 62, the packer wheel 38 and adjustment mechanism 16 enable the packer wheel shift rearwardly a distance 68, enabling clearance for the tripping mechanism of the hoe opener 28. In addition, the adjustment mechanism 16 is configured to shift the packer wheel forwardly after the obstacle 62 has been passed over by the precision hoe opener assembly 10. The adjustment mechanism 82 reduces repair and maintenance costs by allowing movement of the wheel, while improving crop yield and growth by otherwise moving the wheel quite close behind the hoe opener. The adjustment mechanism 82 also enables the packer wheel 38 to maintain contact with the soil 30 as the precision hoe opener assembly 10 passes over the obstacle 62, while the hoe opener 28 is in a retracted position.

Figure 2:
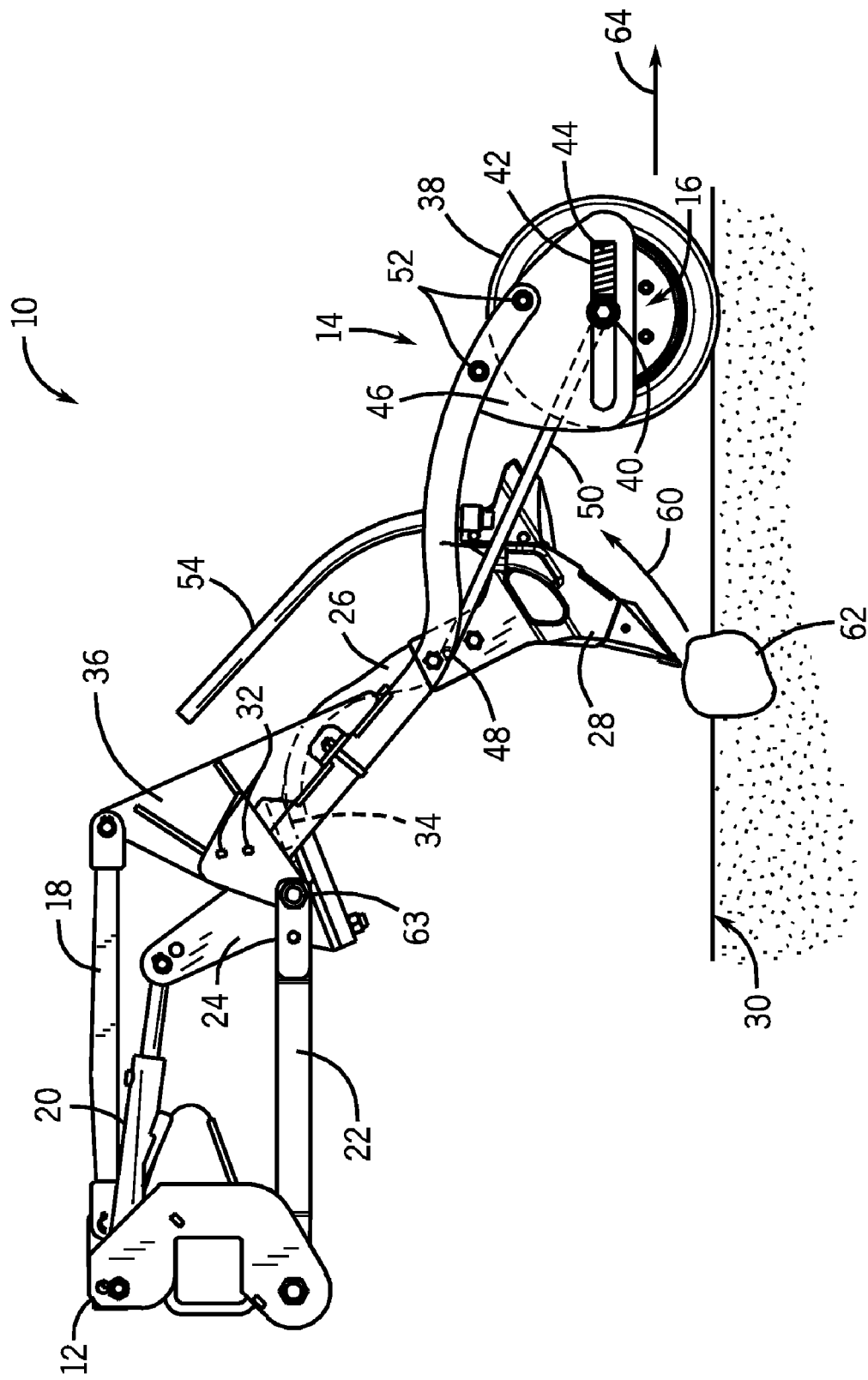
FIG. 2 is a top view of the opener assembly of FIG. 1, showing the opener implement, soil leveling and packer wheel assemblies.

FIG. 2 is a side view of an example of the precision hoe opener assembly 10, with the hoe opener 28 retracted in the direction 60. As described above, the hoe opener 28 retracts to avoid damage from the obstacle 62, which may be a rock, large dirt clod or other debris. As the hoe opener 28 and shank 26 move rearwardly, the member 50, via pivotal couplings 40 and 48, causes the packer wheel 38 to move in the rearward direction 64. By moving the packer wheel 38 and compressing the biasing members 42, the adjustment mechanism 16 enables the hoe opener 28 to remove rearwardly without interference between the components. Accordingly, after the precision hoe opener assembly passes the obstruction 62, the hoe opener 28 may be repositioned in the forward or normal working position, to engage the ground 30 with the packer wheel 38 and insure an accurate seeding process.

Figure 3:
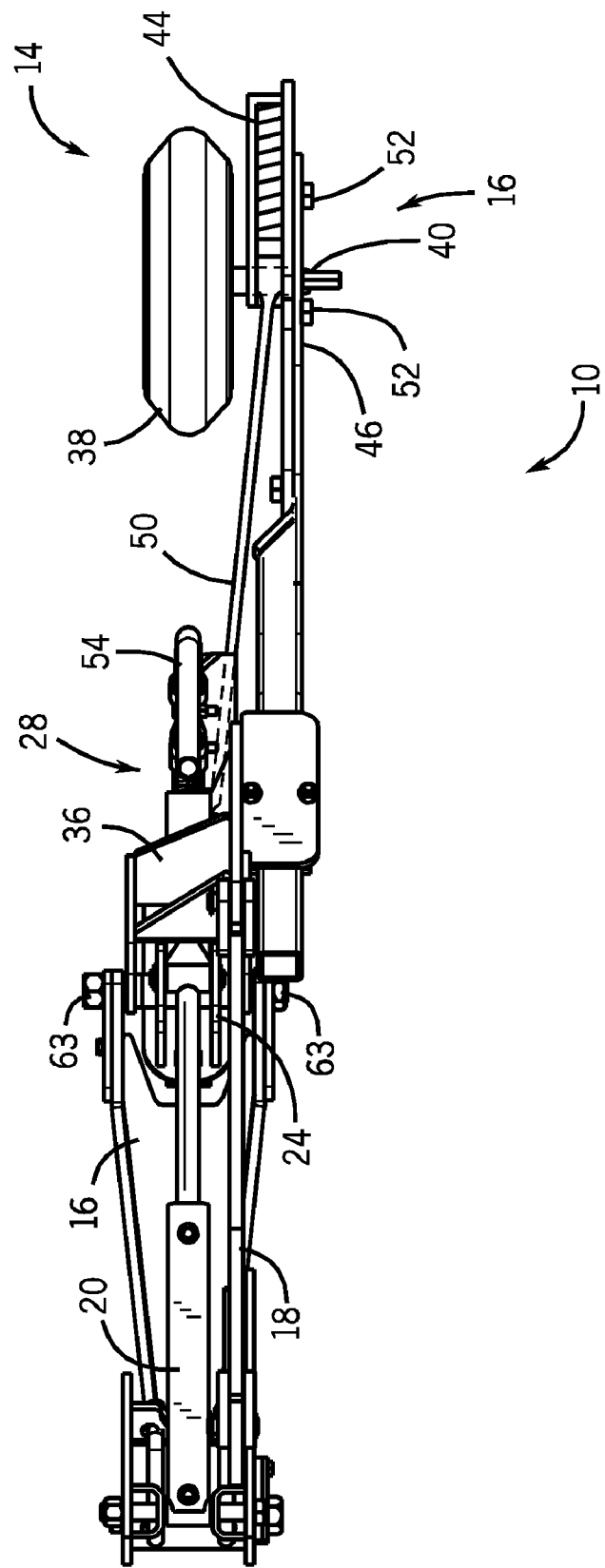
FIG. 3 is a top view of the opener assembly of FIG. 1, showing the opener implement, soil leveling and packer wheel assemblies.

FIG. 3 is a top view of the precision hoe opener assembly 10 and adjustment mechanism 16, as shown in FIG. 1. As depicted, the packer wheel 38 is located directly behind the hoe opener 28. Accordingly, the packer wheel 38 is configured to pack seeding groove in the soil 30 created by the hoe opener 28. Further, the positioning of the packer wheel 38 directly behind the hoe opener 28 enables improved depth control of the seeding process, enhancing seeding efficiency and crop yield. Moreover, the adjustment mechanism 10 enables the hoe opener 28 to avoid the obstacle 62, preventing damage to the assembly and saving system downtime and repair cost.

Figure 4:
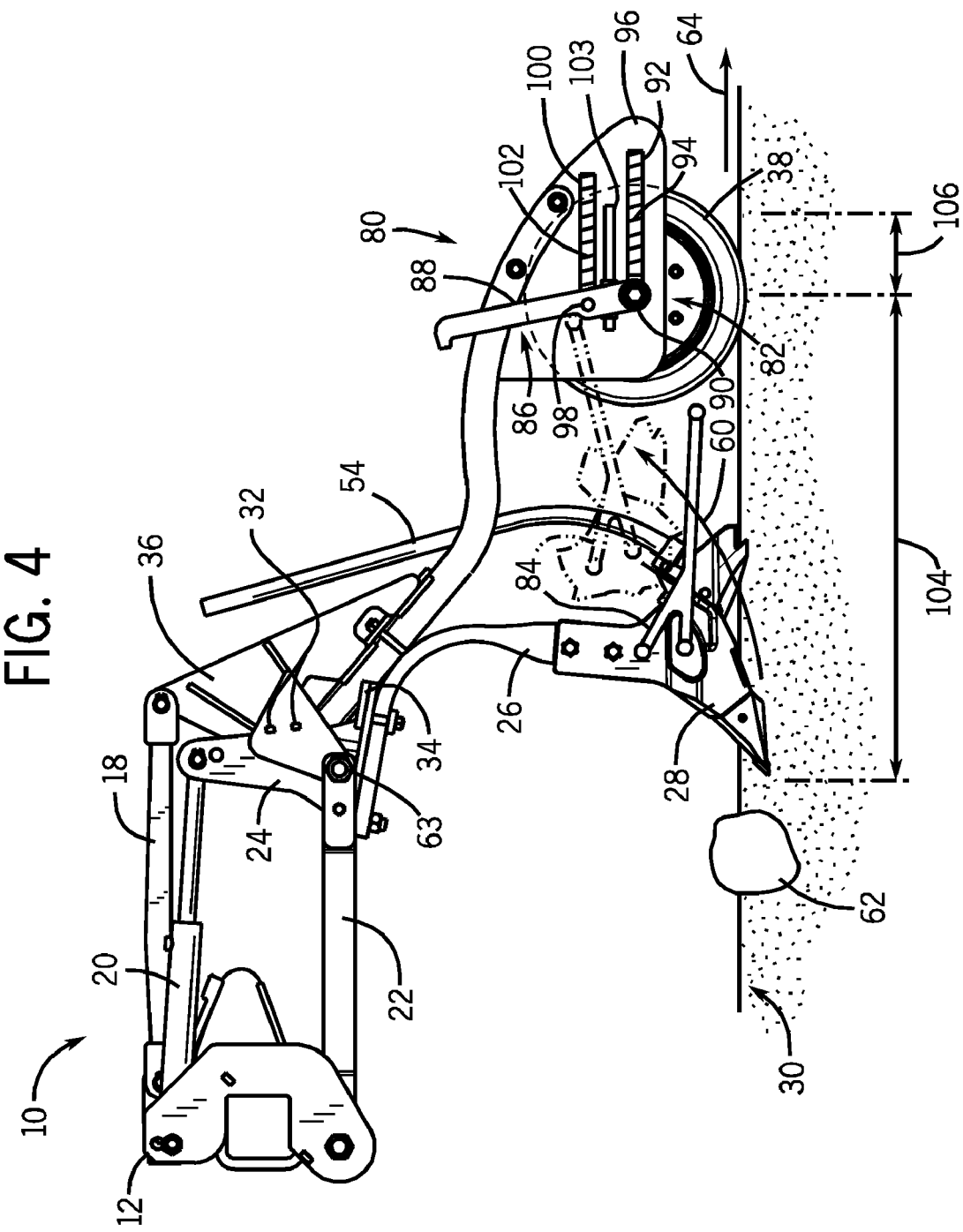
FIG. 4 is a side view of another embodiment of a precision hoe opener assembly including an opener, a packer wheel, and a soil shaping assembly.

FIG. 4 is a side view of another example of the precision hoe opener assembly 10, including a packer wheel assembly 80 and adjustment mechanism 82. The precision hoe opener assembly 10 includes the members 18 and 22, which work with the cylinder 20 to control the position of the packer wheel assembly 80 and shank 26. Further, the rear frame 36 is coupled to the packer wheel assembly 80 via the packer wheel arm 37. The packer wheel arm 37 may be attached to the rear frame 36 via fasteners, such as bolts that are U-shaped or rivets. Further, the shank 26 may be coupled to a protruding member 84 that is part of the adjustment mechanism 82 to provide clearance to the hoe opener 28 upon tripping in the rearward direction 60. Specifically, the protruding member 84 may contact a receiving surface 86 of a receiving member 88 when the hoe opener 28 moves in the rearward direction 60. The receiving member 88 may be coupled to an axle 90, which rotationally supports the packer wheel 38. The axle 90 is located within a slot 92 and is coupled to a biasing member 94, such as a spring, that is configured to urge the packer wheel 38 forward. The slot 92 is located in a bracket 96 configured to support the packer wheel 38 and couple to the packer wheel arm 37 via fasteners, such as bolts or rivets. The receiving member 88 may also be coupled, via a pin 98, to a second slot 100 in the bracket 96. The slot 100 may provide additional support between the receiving member 88, bracket 96, and other components of the adjustment mechanism 92. Further, the slot 100 may include a biasing member 102, wherein the biasing members 94 and 102 cooperatively urge the packer wheel 38 in a forward direction. The assembly also includes a third slot 103, to further provide support as the packer wheel is pushed rearwardly 64 to provide clearance for the hoe opener 28.

As may be appreciated, the hoe opener 28 may trip in the rearward direction 60 upon encountering the obstacle 62, necessitating a clearance from the packer wheel 38 to avoid interference between the wheel 38 and opener 28. Further, preventing the hoe opener 28 from engaging the obstacle 62 avoids damage to components, such as a chisel, of the hoe opener, reducing or eliminating costly repairs. As the hoe opener 28 shifts rearwardly, the protruding member 84 engages the receiving member 88, via the receiving surface 86. Accordingly, the receiving member 88 may be pushed rearwardly in the direction 64, overcoming the forces of the biasing members 94 and 102 to move the packer wheel 38 rearwardly. Further, the depicted normal or forward position of the packer wheel 38 positions the packer wheel at a distance 104 from the hoe opener 28. In addition, as the hoe opener 28 encounters the obstacle 62, the adjustment mechanism 82, including the protruding member 84, receiving member 88, slot 92, and biasing member 94 enables the packer wheel 38 to move rearwardly a distance 106. In addition, the adjustment mechanism 82 is configured to shift the packer wheel forwardly after the obstacle 62 has been passed over by the precision hoe opener assembly 10.

Further, the adjustment mechanism 82 and packer wheel assembly 80 are configured to move the packer wheel 38 from a position directly behind the opener 28, rearwardly to provide clearance for the hoe opener 28 upon tripping. The adjustment mechanism 82 also enables the packer wheel 38 to maintain contact with the soil 30 as the precision hoe opener assembly 10 passes over the obstacle 62, while the hoe opener 28 is in a retracted position. The arrangement of the adjustment mechanism 82, packer wheel assembly 80, and hoe opener 28 enable the precision hoe opener assembly 10 to provide improved accuracy and control over seeding depth while accounting for obstacles to prevent damage to the assembly. Accordingly, the adjustment mechanism 82 reduces repair and maintenance costs while improving crop yield and growth.

Figure 5:
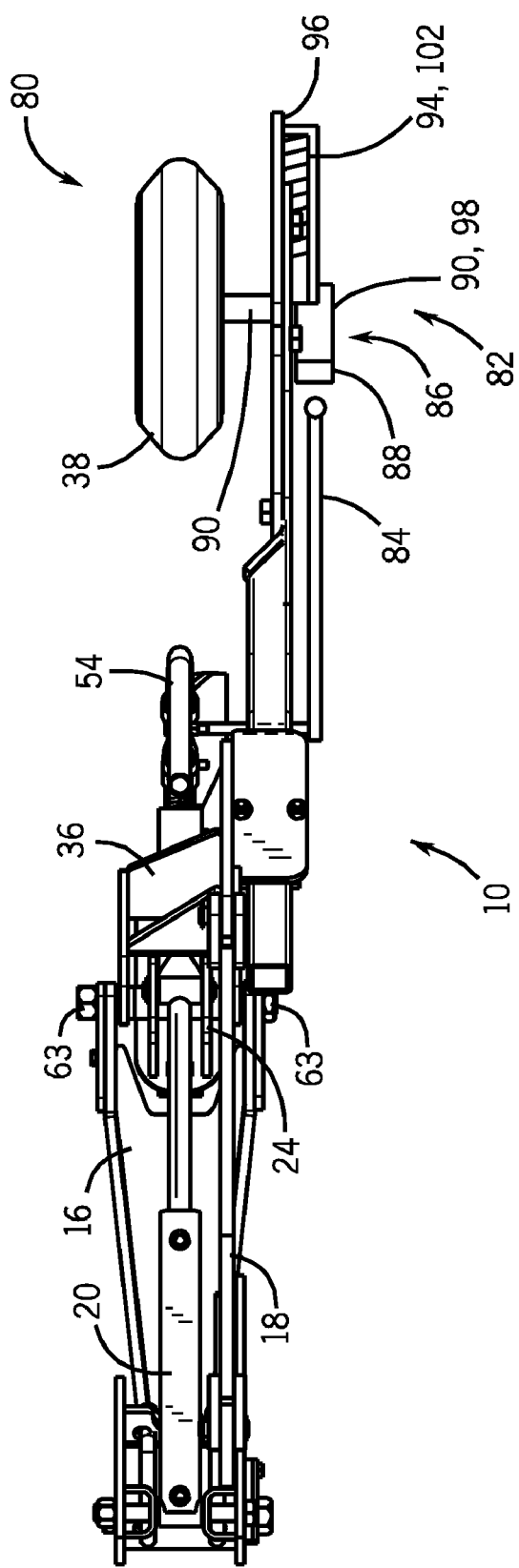
FIG. 5 is a top view of the opener assembly of FIG. 3, showing the opener implement, soil leveling and packer wheel assemblies.

FIG. 5 is a top view of the precision hoe opener assembly 10 and adjustment mechanism 82, as shown in FIG. 4. As depicted, the packer wheel 38 is positioned directly behind the hoe opener 28, providing a precise seeding depth control for the precision hoe opener assembly 10, increasing crop yield and minimizing the number of passes needed to fertilize a field. Further, the adjustment mechanism 82 provides clearance for the hoe opener 28 to retract rearwardly by moving the packer wheel 38 rearwardly. The adjustment mechanism enables the packer wheel 38 to avoid interference with the tripped hoe opener 28 by moving rearwardly and returns the packer wheel 38 to the forward position after the obstacle 62 has been passed over by the hoe opener assembly 10. Moreover, by providing clearance to the hoe opener 28, the adjustment mechanism 82 prevents and avoids damage to the hoe opener 28, thus avoiding downtime while saving repair costs for the precision hoe opener assembly 10.

Figure 6:
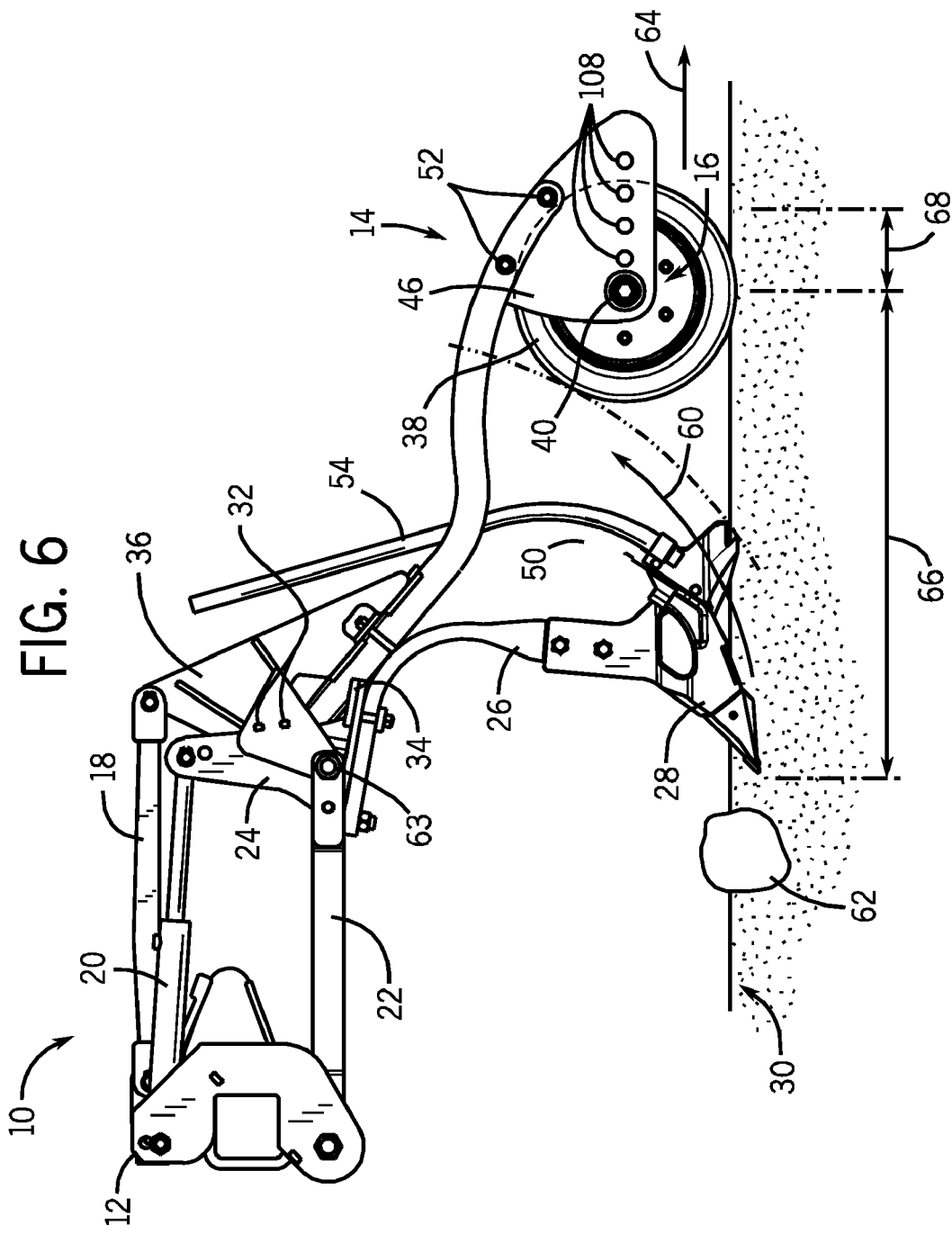
FIG. 6 is a side view of an embodiment of a ground engaging implement designed to permit manual adjustment of a distance between the packer wheel and a ground engaging tool.

FIG. 6 illustrates an embodiment in which the distance between the packer wheel is manually adjustable. In this embodiment, the mounting bracket 46 includes a series of holes 108 in which the axle 40 of the packer wheel may be placed. The axle may include threads that interface with a mating nut, or may be pinned or otherwise removably fixed to the mounting bracket for this purpose. Thus, the wheel may be secured to the mounting bracket in any of a number of different locations, increasing or decreasing the distance between the hoe opener and the packer wheel. It should be noted that the hoe opener, or any other ground engaging tool fitted to the implement, may still be designed to move upwardly and rearwardly in the event that it encounters an obstruction. In such cases, the forward-most location of the packer wheel may be provided to ensure clearance between the packer wheel and the rearward-most component of the tool.

The arrangement of FIG. 6 may be beneficial for a number of applications. For example, when the implement is towed through a field at a relatively low speed, the valley opened by the ground engaging tool may be closed by the wheel more appropriately when the wheel is positioned closer to the tool. On the contrary, when the implement is towed more quickly, it may be preferable to allow more time for the soil to settle before closing the valley and packing the soil. In such cases, a greater distance between the tool and the packer wheel will allow for such settling.

It should also be noted that, while a series of discrete locations are illustrated as provided in the mounting bracket, other arrangements may be envisaged. For example, the wheel could be mounted on a swing arm or other structure that permits adjustment of the distance between the tool and the packer wheel. Similarly, a continuously adjustable arrangement may be employed rather than the discrete positions illustrated, such as by use of a threaded rod, bolt, or other continuously adjustable mechanism.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A seeding implement, comprising:
a frame configured to couple to a tool bar;

a linkage coupled to the frame;

a ground engaging tool extending from a shank, wherein the shank is coupled to the linkage and configured to be automatically displaced upon encountering an obstruction;

a packer wheel configured to control a position of the ground engaging tool, wherein the packer wheel is positioned behind the ground engaging tool when the ground engaging tool is engaging soil; and an adjustment mechanism configured to permit manual adjustment of a distance between the packer wheel and the ground engaging tool, wherein the adjustment mechanism comprises an axle of the packer wheel and a mechanical member providing multiple discrete locations, wherein the axle is mountable to each of the multiple discrete locations, and each discrete location corresponds to an aperture in a packer wheel mounting structure.

2. The implement of claim 1, wherein the ground engaging tool is mounted on a movable structure that permits the ground engaging tool to move rearwardly and upwardly upon encountering an obstruction.

3. The implement of claim 2, wherein a forward-most position permitted by the adjustment mechanism is sufficiently rearward to permit the ground engaging tool to clear the packer wheel when displaced rearwardly and upwardly upon encountering an obstruction.

4. The implement of claim 2, wherein the packer wheel is configured to maintain contact with the ground as the obstruction passes beneath the implement.

5. The implement of claim 1, wherein the ground engaging tool comprises a hoe opener.

6. A seeding implement, comprising:
a frame configured to couple to a tool bar;
a linkage coupled to the frame;
a ground engaging tool extending from a shank, wherein the shank is coupled to the linkage, the ground engaging tool being mounted on a movable mechanism that allows the ground engaging tool to more rearwardly and upwardly upon encountering an obstruction;

a packer wheel configured to control a position of the ground engaging tool, wherein the packer wheel is positioned behind the ground engaging tool when the ground engaging tool is engaging soil; and an adjustment mechanism configured to permit manual adjustment of a distance between the packer wheel and the ground engaging tool, wherein the adjustment mechanism comprises an axle of the packer wheel and a mechanical member providing multiple discrete locations, wherein the axle is mountable to each of the multiple discrete locations, and each discrete location corresponds to an aperture in a packer wheel mounting structure.

7. The implement of claim 6, wherein a forward-most position permitted by the adjustment mechanism is sufficiently rearward to permit the ground engaging tool to clear the packer wheel when displaced rearwardly and upwardly upon encountering an obstruction.

8. The implement of claim 6, wherein the packer wheel is configured to maintain contact with the ground as the obstruction passes beneath the implement.

9. The implement of claim 6, wherein the ground engaging tool comprises a hoe opener.

\* \* \* \* \*